SWITCHING ARRANGEMENT FOR COIN-OPERATED PHONOGRAPH SYSTEMS
Filed Aug. 2, 1963
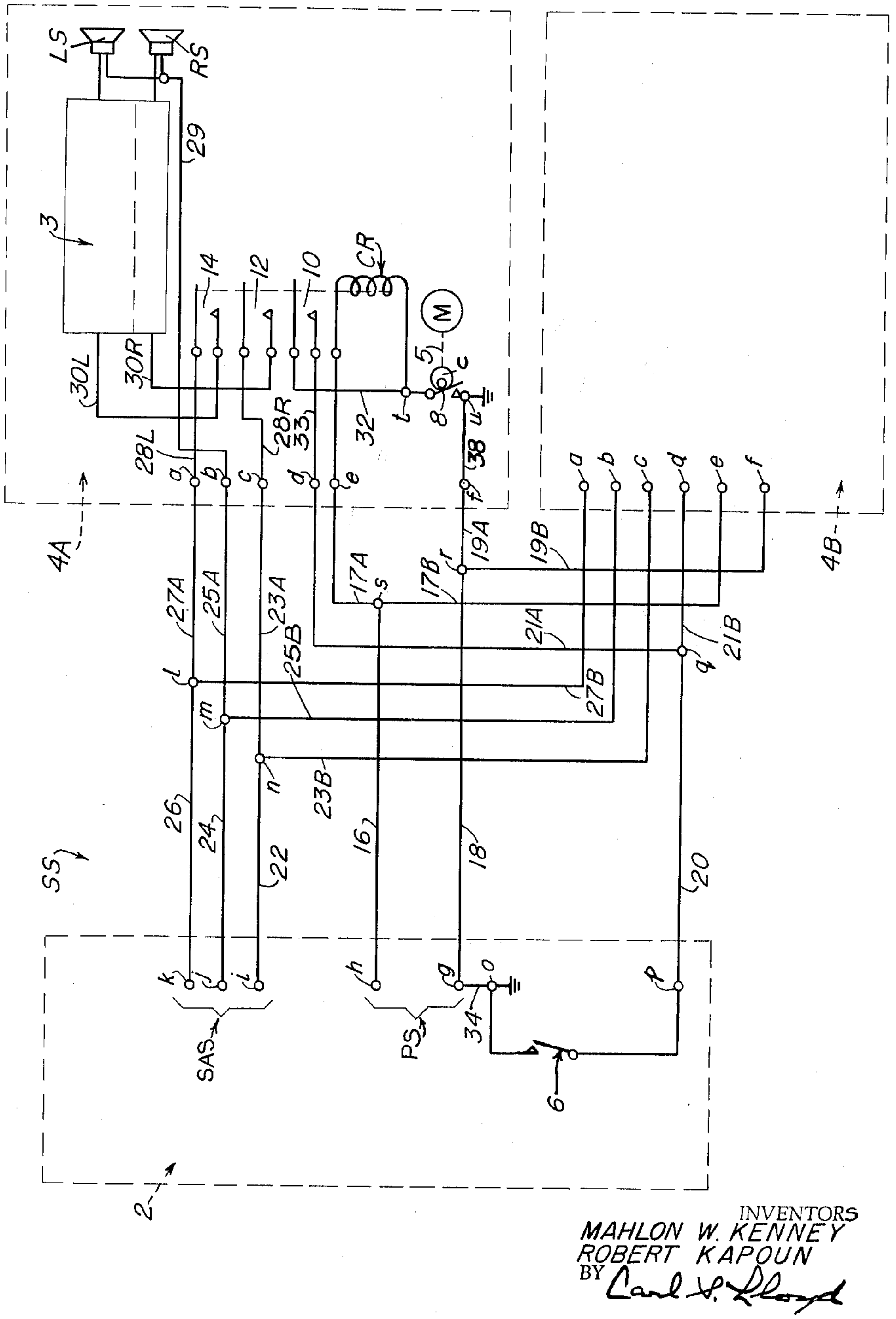
INVENTORS
MAHLON W. KENNEY
ROBERT KAPOUN
BY Carl V. Lloyd
Att'y.

3,202,255
Patented Aug. 24, 1965

3,202,255

SWITCHING ARRANGEMENT FOR COIN-OPERATED PHONOGRAPH SYSTEMS

Mahlon W. Kenney, Oak Park, and Robert Kapoun, Glenview, Ill., assignors to The Seeburg Corporation, Chicago, Ill.

Filed Aug. 2, 1963, Ser. No. 299,572
7 Claims. (Cl. 194—1)

This invention relates to switching arrangements for coin-operated phonograph systems and more particularly to a switching arrangement for transmitting sound from a main phonograph unit to selected ones of several remote phonograph units in response to the selection of records at the remote phonograph units.

The conventional practice in the commercial installation of coin-operated phonograph units has been to provide a main phonograph unit (which stores records for selection and play) and a series of remote phonograph units (which may be utilized for the selection of records to be played at the main phonograph unit). Thus, for example, in a typical restaurant installation, from six to twelve (or even more or less) remote phonograph units might be positioned in the several booths of the restaurant so that a customer seated in a given booth can deposit coins and select a record stored in the main phonograph unit, which record may then be heard from the speaker of the main phonograph unit itself. Selection is effected in a conventional manner by utilization of numbered and lettered selector button circuits.

In many installations, the practice of playing the selected record only at the main phonograph unit tends to be unsatisfactory since some customers may not be willing to pay for a record selection which does not carry over to their particular locales (e.g., due to the acoustic environment of the phonograph installation). At the same time, if all of the remote phonograph units were equipped for sound transmission, so that a selected record would play at each remote phonograph unit, some other customers might prefer to avoid the playing of music at their particular locales. One approach directed to the latter preference would be to provide an on-off audio control for each remote phonograph unit; however, this is not considered feasible since experience indicates that intra-customer squabbling results when one customer is provided with the ability to cut off another customer's selection. The most practical solution seems to be an arrangement whereby remote phonograph units are equipped to deliver audio signals selectively so that the recorded music is played at the main phonograph unit. In the embodiment remote phonograph units which are connected thereto by virtue of the desire of a customer at a given remote phonograph unit to make a record selection and so that, once a given remote phonograph unit is connected to the main phonograph unit, it remains connected thereto so long as music is being selected at any unit of the phonograph installation.

It is a primary object of this invention to provide such an arrangement in a coin-operated phonograph installation in the form of a switching system for selectively interconnecting any one of a series of remote phonograph units with a main phonograph unit and for retaining the interconnection so long as any music is being selected or played at the mai phonograph unit. In the embodiment disclosed herein, the switching system interconnects a coin-operated stereophonic main phonograph unit, at which records are stored for selection and play, and a series of coin-operated sterephonic remote phonograph units, at which records stored in the main phonograph unit may be selected and played over a stereophonic speaker system within the remote unit itself. Each of the remote phonograph units is provided with a control relay having a normally opened control switch in series therewith, and the control relay and control switch series combinations of the respective units are connected in parallel with each other across suitable power means in the main phonograph unit. Motor operated cam means are provided in each remote phonograph unit for closing the control switch therein in response to a record selection made at the particular remote phonograph unit, and the power means in the main phonograph unit is adapted to energize a given control relay in response to the closing of the control switch associated therewith. Each of the remote phonograph units is also provided with audio switch means and sterephonic dual channel speaker means in series therewith, such that audio signals from the main phonograph unit may be transmitted through the series connected audio switches to the speakers of the respective remote phonograph units. Each control relay is provided with a normally opened relay hold switch in series therewith and adapted to be closed thereby, and the relay hold switches of the respective units are connected in parallel with each other and in series with a normally opened play control switch provided in the main phonograph unit. The play control switch is adapted to be closed whenever a record selected either at the main phonograph unit or at any of the remote phonograph units is being played and to remain closed for the duration of play of a selected record and of any subsequent records selected either at the main phonograph unit or at any of the remote phonograph units prior to the termination of play of a selected record. In this manner, the control relay of a given remote phonograph unit may be self-lockingly energized upon the selection of a record at that unit in order to provide for transmission of audio signals from the main phonograph unit to the given remote phonograph unit for the duration of play of a record selected at the given remote phonograph unit and of any subsequent records selected either at the main phonograph unit or at any of the remote phonograph units prior to the termination of play of the record selected at the given remote phonograph unit.

Accordingly, it is yet another object of this invention to provide means in a coin-operated phonograph installation for transmitting audio signals from a main phonograph unit to a given one of a series of remote phonograph units upon the selection of a record at that given one unit and to maintain the transmission of audio signals to the given one unit for the duration of play of the record selected therein and of any subsequent records selected either at the main phonograph unit or at any of the remote phonograph units prior to the termination of play of the record selected at the given one unit.

In a more specific sense, it is an object of this invention to provide self-locking relay means in each of a series of remote phonograph units adapted to receive and play an audio signal from a main phonograph unit, which self-locking relay means are each adapted to maintain the transmission of audio signals for the duration of play of a record selected at a given remote phonograph unit and of any subsequent records selected at either the main phonograph unit or at any of the series of remote phonograph units prior to the termination of play of the selected record.

These and other objects, advantages, and features of the subject invention will hereinafter appear, and, for purposes of illustration, but not of limitation, an exemplary embodiment of the subject invention is shown in the appended drawing, in which:

A switching system constructed in accordance with the subject invention is generally designated by the reference character SS. The reference numeral 2 represents a main coin-operated stereophonic unit in which records are stored for selection and play in a conventional manner.

A series of remote phonograph units are connected to the main phonograph unit 2 by means of the indicated circuitry. In the described embodiment, only two remote phonograph units 4A and 4B are illustrated, with unit 4B being connected parallelly with unit 4A, although it should be understood that in a typical installation, anywhere from one to twelve or more parallelly connected remote units are utilized in conjunction with a main unit. Also, only the unit 4A is described in detail, although additional units (such as the schematically illustrated unit 4B) are identical to the unit 4A.

The main phonograph unit 2 is provided with terminals *k*, *j*, and *i*, which are adapted for connection to the stereophonic audio system (generally indicated by SAS) of the main unit 2. Leads 22, 24, and 26 connect the respective terminals *i*, *j*, and *k* to parallel tap terminals *n*, *m*, and *l*. Leads 27A and 27B connect the tap terminal *l* to the respective terminals *a* of the remote units 4A and 4B. As shown for the remote unit 4A, each remote unit is provided with a dual channeled speaker system comprising the stereo speakers LS and RS and with a loudness control network 3, which is preferably provided with a low-medium-high volume control arrangement (not shown). A normally opened relay audio switch 14 is connected in series with the volume control network 3 and the terminal *a* by means of leads 28L and 30L. Similarly, a normally opened relay audio switch 12 is connected in series with the volume control network 3 and with the terminal *c* by means of leads 28R and 30R. A common lead 29 interconnects the terminal *b* and the stereo speakers LS and RS to complete the stereophonic audio transmission network.

A control relay CR is provided in the remote unit and is adapted, upon energization, to close the relay switches 12 and 14 so as to complete audio transmission from the main phonograph unit to the stereo speakers LS and RS of the remote unit 4A. A power supply source in the main unit 2 (generally indicated by PS) is connected between terminals *g* and *h* thereof, and leads 16 and 18 connect the respective terminals *h* and *g* with parallel tap terminals *s* and *r*. Leads 17A and 17B and 19A and 19B connect the respective parallel tap terminals *s* and *r* with the respective terminals *e* and *f* of the remote units 4A and 4B. The relay CR is connected between terminals *e* and *t* of the remote unit 4A, and a cam-operated normally opened switch 8 is connected between the terminal *t* and a grounded terminal *u*. A lead 38 interconnects the terminal *u* and the treminal *f*.

A normally opened relay hold switch 10 is connected between the terminal *t* (by a lead 32) and the terminal *d* (by a lead 33) of the remote unit 4A. The hold switch 10 corresponds to the audio switches 12 and 14 and is adapted to be closed upon energization of the control relay CR. A lead 20 interconnects a terminal *p* of the main phonograph unit 2 and a parallel tap terminal *q*. Leads 21A and 21B connect the parallel tap terminal *q* with the respective terminals *d* of the remote units 4A and 4B. A play control switch 6 is connected between the terminal *p* and a grounded terminal *o* of the main phonograph unit 2. Terminals *g* and *o* are interconnected by a lead 34 to ground. The play control switch 6 is adapted to be automatically closed whenever a selected record stored in the main phonograph unit 2 is being played, as well as whenever the conventional scanning mechanism (not shown) of the phonograph 2 is operatively engaged in selecting a given record for play. A motor M is provided in the remote unit 4A and is adapted by conventional means to be energized for a cycle of revolution upon selection of a given record at the remote unit 4A. The motor M drives a cam C via an interconnection indicated by the reference numeral 5, and the cam C is adapted to close the switch 8 during the major portion of its cycle of revolution (e.g., in a typical embodiment, during about 93% of its one-revolution cycle).

In use, the switching system SS will normally be maintained in the position shown in the drawing, which for convenience is referred to as a "stand-by" position. When a selection is initially made at the main phonograph unit 2, conventional means activate the scanning mechanism thereof (not shown) to remove the selected record for play, and the selected record will be played over the stereophonic audio system SAS of the main unit 2. As previously indicated, the play control switch 6 will be closed during both the scanning and the play operations, and for convenience this position of the switching system SS is referred to as a "main play" position. Thus, the play control switch 6 will remain in the closed main play position for the duration of play of a given selected record as well as for the duration of play of any record selected prior to the termination of play of the given selected record.

However, the audio signals corresponding to the selected record will not be transmitted through either of the remote units 4A and 4B. After the selected record has been played and if no further selections have been made prior to the termination of play of the selected record, the system will revert to the stand-by position shown in the drawing (i.e., play control switch 6 will open).

When a selection is initially made at a remote unit, as for example the remote unit 4A, conventional means transform a selection signal to the main unit 2 in order to activate scanning and play operations therein (i.e., a main play position occasioned by the closing of play control switch 6). Also, in the remote unit 4A itself, the motor M will be energized for one cycle of revolution during the selection process, and the switch 8 will be closed by the cam C, as previously described. When the switch 8 closes, the control relay CR is energized, and the switches 10, 12, and 14 are closed. The closing of audio switches 12 and 14, as previously described, serves to transmit the stereophonic audio signals from the main phonograph unit 2 through the stereo speakers LS and RS of the remote unit 4A, so that the selection may be heard both at the main unit 2 and at the remote unit 4A. For convenience this position of the switching system SS is referred to as a "remote play" position. Of course, when a remote play position is achieved, the volume of play at the remote unit may be scaled to suit the customer's tastes by utilization of the volume control network 3.

Also, the scanning and playing of the selected record in the main unit 2 closes the play control switch 6 so as to complete a relay hold circuit from the terminal *h* through lead 16, terminal *s*, lead 17A, terminal *e*, control relay CR, terminal *t*, lead 32, closed hold switch 10, lead 33, terminal *d*, lead 21A, terminal *q*, lead 20, terminal *p*, closed switch 6, and grounded terminal *o*. In this manner, the control relay CR will be self-lockingly energized, notwithstanding the subsequent opening of the switch 8, so long as the play control switch 6 remains closed, i.e., so long as the main play position is maintained without an intervening stand-by position, the remote play position will likewise be maintained. If someone were to select a second record at the main phonograph unit 2, at any of the remote units (e.g., remote unit 4B), or even at the remote unit 4A itself during the course of play of a record initially selected at the remote unit 4A, the second selected record would be played in its turn simultaneously at both the main phonograph unit 2 and the remote phonograph unit 4A, since the play control switch 6 would remain continuously closed to maintain the remote play position for the unit 4A without an intervening stand-by position. However, if a stand-by position should intervene prior to the selection of a second record, the play control switch 6 would be opened, and the control relay CR would be de-energized (thereby extinguishing the remote play position).

Thus, with the described system in its stand-by position, a record selected either at the main phonograph unit or at any one of the several remote phonograph units will always be played at the main phonograph unit (i.e., main play position) and will be simultaneously played at a given remote phonograph unit (i.e., remote play position for that unit) when the selection initiates at that remote unit. If a selection is made at a given remote unit while the main phonograph unit is playing a record, the remote unit will get the remaining portion of the record then playing, all of the other records already selected on the main phonograph unit, and the records selected at the remote unit itself. If a selection is then made at still another remote unit, it too will hear all records already selected plus those selected at it, and the first remote unit will also hear these new selections, just as long as the main phonograph unit does not go into stand-by in the meantime. Each remote unit can thus be connected to the music being played at the main phonograph unit upon making a selection at the remote unit, and, once connected, the remote unit will remain connected to the music until the main phonograph unit goes into stand-by (i.e., until the play control switch 6 is opened). Once the play control switch 6 is opened, all remote units will be disconnected, and can be reconnected to a remote play position only by making a selection at each (i.e., by closing switch 8 via energization of the motor M). Thus, a first record selected at a given remote phonograph unit will be simultaneously played both at the main phonograph unit and at the given remote phonograph unit, and any subsequent records selected either at the main phonograph unit, at the given remote phonograph unit, or at another remote phonograph unit prior to the termination of play of the first record will likewise be played both at the main phonograph unit and at the given remote phonograph unit, as well as at the said another remote phonograph unit, if the subsequent record should happen to be selected thereat.

While the invention has been described with reference to a schematic illustrative embodiment thereof, it should be understood that various changes, modifications, and alterations may be effected in the details and arrangements of the various elements, without departing from the spirit and the scope of the instant invention, as defined in the appended claims.

What is claimed is:

1. A switching system for interconnecting a coin-operated main phonograph unit, at which records are stored for selection and play, and a coin-operated remote phonograph unit, at which records stored in the main phonograph unit may be selected and played, comprising:

relay means in the remote phonograph unit;

switch means adapted to be closed by said relay means in order to transmit audio signals from the main phonograph unit to the remote phonograph unit;

selection responsive means for energizing said relay means in response to a record selection made at the remote phonograph unit; and self-locking means for retaining said relay means in an energized state for the duration of play of a record selected at the remote phonograph unit and of any subsequent records selected either at the main phonograph unit or at the remote phonograph unit prior to the termination of play of the selected record.

2. A system as claimed in claim 1 in which the said selection responsive means comprises: a normally opened switch in series with the relay means; and a motor operated cam adapted to close the said normally opened switch.

3. A system as claimed in claim 1 in which the said self-locking means comprises a normally opened relay hold switch, connected in series with the relay means and adapted to be closed upon the energization thereof, and a normally opened play control switch in the main phonograph unit, connected in series with the relay switch and adapted to be closed for the duration of play of a record selected at the remote phonograph unit and of any subsequent records selected either at the main phonograph unit or at the remote phonograph unit prior to the termination of play of the selected record.

4. A switching system for interconnecting a coin-operated main phonograph unit, at which records are stored for selection and play, and a coin operated remote phonograph unit, at which records stored in the main phonograph unit may be selected and played, comprising:

relay means in the remote phonograph unit;

switch means adapted to be closed by said relay means in order to transmit audio signals from the main phonograph unit to the remote phonograph unit;

selection responsive means for energizing said relay means in response to a selection made at the remote phonograph unit and comprising a normally opened swtich in series with the relay means and a motor operated cam for closing said normally opened switch in response to a record selection made at the remote phonograph unit; and self-locking means for retaining said relay means in an energized state and comprising a normally opened relay hold switch, connected in series with the relay means and adapted to be closed upon the energization thereof, and a normally opened play control switch in the main phonograph unit, connected in series with the relay switch and adapted to be closed for the duration of play of a record selected at the remote phonograph unit and of any subsequent records selected either at the main phonograph unit or at the remote phonograph unit prior to the termination of play of the selected record.

5. A switching system for interconnecting a main coin-operated stereophonic phonograph unit and a remote coin-operated stereophonic phonograph unit comprising:

a control relay in the remote phonograph unit;

power means adapted for energizing the said control relay;

a normally opened control switch in series with the control relay;

motor operated cam means in the remote phonograph unit adapted to close the control switch in response to a record selection made at the remote phonograph unit;

a first and a second normally opened audio switch, each adapted to be closed upon energization of the control relay;

a first and a second speaker in the remote phonograph unit, each connected in series with one of the audio switches;

means adapted for transmission of first and second audio signals from the main phonograph unit through respective ones of the speakers and the series connected audio switches associated therewith;

a normally opened relay hold switch in series with the control relay and adapted to be closed thereby; and a normally opened play control switch in the main phonograph unit, the said play control switch being connected in series with the relay hold switch and being adapted to be closed whenever a record selected either at the main phonograph unit or at the remote phonograph unit is being played, and to remain closed for the duration of play of the selected record and of any subsequent records selected either at the main phonograph unit or at the remote phonograph unit prior to the termination of play of the selected record, whereby the control relay of the remote phonograph unit may be self-lockingly energized in order to provice for continuous transmission of the audio signals from the main phonograph unit to the remote phonograph unit for the duration of play of a record selected at the remote phonograph unit and of any subsequent records selected either at the main phonograph unit or at the remote phonograph unit prior to the termination of play of the record selected at the remote phonograph unit.

6. A switching system for interconnecting a coin-operated main phonograph unit, at which records are stored for selection and play, and first and second coin-operated remote phonograph units, at which records stored in the main phonograph unit may be selected and played, comprising:

relay means in each remote phonograph unit and connected in parallel;

selection responsive means in each remote phonograph unit for energizing the relay means associated therewith in response to a record selection made at the remote phonograph unit associated with the energized relay means;

switch means in each remote phonograph unit and connected in parallel, each said switch means being adapted to be closed upon energization of the relay means associated therewith in order to transmit audio signals from the main phonograph unit to the remote phonograph unit associated with the energized relay means; and self-locking means in each remote phonograph unit and connected in parallel, each said self-locking means being adapted to continuously retain the relay means associated therewith in an energized state for the duration of play of a record selected at the remote phonograph unit associated with the energized relay means and for the duration of play of any subsequent records selected either at the main phonograph unit or at either of the remote phonograph units prior to the termination of play of the record selected at the said remote phonograph unit associated with the energized relay means.

7. A switching system for interconnecting a main coin-operated stereophonic phonograph unit and first and second remote coin-operated stereophonic units comprising:

a control play in each remote phonograph unit and connected in parallel;

power means adapted for energizing the said control relays;

a normally opened control switch in each remote phonograph unit, each said switch being connected in series with the control relay associated therewith;

motor operated cam means in each remote phonograph unit, each said cam means being adapted to close the control switch associated therewith in response to a record selection made at the remote phonograph unit associated therewith;

a first and a second normally opened audio switch in each remote phonograph unit, each said audio switch being adapted to be closed upon energization of the control relay associated therewith;

a first and a second speaker in each remote phonograph unit, each said speaker being connected in series with respective ones of the audio switches of the remote phonograph unit associated therewith;

means adapted for transmission of audio signals from the main phonograph unit to the speakers and the series connected audio switches of each remote phonograph unit;

a normally opened relay hold switch in each remote phonograph unit, each said hold switch being connected in series with and being adapted to be closed by the control relay associated therewith; and a normally opened play control switch in the main phonograph unit, the said play control switch being connected in series with each relay switch and being adapted to be closed whenever a record selected either at the main phonograph unit or at either of the remote phonograph units is being played, and to remain closed for the duration of play of the selected record and of any subsequent records selected either at the main phonograph unit or at either of the remote phonograph units prior to the termination of play of the selected record, whereby the control relay of each remote phonograph unit may be self-lockingly energized in order to selectively provide for continuous transmission of audio signals from the main phonograph unit to a given remote phonograph unit.

References Cited by the Examiner

UNITED STATES PATENTS

| | | | |
|---|---|---|---|
| 2,021,705 | 11/35 | Thomas | 340—162 X |
| 2,586,213 | 2/52 | Ellis | 194—15 X |

SAMUEL F. COLEMAN, *Primary Examiner.*

LOUIS J. DEMBO, *Examiner.*